United States Patent
Schock

[15] 3,685,800
[45] Aug. 22, 1972

[54] TREE JACK DIRECTIONAL FRAME SYSTEM

[72] Inventor: Carlyle W. Schock, Culpeper, Va. 22701

[22] Filed: Feb. 5, 1971

[21] Appl. No.: 112,946

[52] U.S. Cl. ............................... 254/93 R, 254/133
[51] Int. Cl. ............................................. B66f 3/24
[58] Field of Search................254/93, 133; 144/34 A

[56] References Cited

UNITED STATES PATENTS 2,707,615   5/1955   Green ................254/133 R X
2,960,309   11/1960   Swanson ................254/133 R Primary Examiner—Robert C. Riordon
Assistant Examiner—David R. Melton
Attorney—Walter G. Finch

[57] ABSTRACT

A tree jack directional frame system is provided for use in directing the path of travel of a tree that is to be felled. It consists of an open frame of substantially equilateral configuration, having spaced support members positioned between the sides to prevent the sides from bowing in. A hydraulic or screw type jack is provided between two parallel support members and it is used for extending a slidable rod positioned within a housing and having an arcuate member or bar on one end thereof for engaging and biting into a tree intermediate the height of the tree. The opposite end of the rod is coupled to the hydraulic jack. One side of the frame is positioned against the ground. Pressure is applied by the hydraulic jack to the rod, which, in turn, applies pressure to the tree to cause it to fall in the desired direction when being felled.

5 Claims, 3 Drawing Figures

INVENTOR
CARLYLE W. SCHOCK
BY *Walter G. Finch*
ATTORNEY

TREE JACK DIRECTIONAL FRAME SYSTEM

This invention relates generally to tree felling jack devices and more particularly it pertains to a tree jack directional frame system for use in directing the path of travel of a tree that is to be felled.

It is important that a tree that is to be cut down, fall in the proper direction, either to prevent damage to adjacent trees or ground, or to adjacent buildings and equipment, or to facilitate the tree falling in the proper direction, as required.

It is an object of this invention, therefore, to provide a tree jack directional frame system for directing, as desired, a tree to fall in the proper direction when it is cut down.

Still another object of this invention is to provide a tree jack directional frame system which is of simple construction, and which makes use of a hydraulic or screw type jack, for imparting and continuing to impart a thrust against an upper portion of a tree from a point of ground anchorage to cause the tree when cut at the trunk to fall in a selected or predetermined direction.

Still even another object of this invention is to provide a compact, light-weight, and strong tree jack directional frame system which is easy to install against a tree and operate once installed to cause a tree to fall in a predetermined direction when the tree is felled.

Still even another object of this invention is to provide a tree jack directional frame system which is inexpensive and economical to manufacture, and which is simple in operational use.

Other objects and attendant advantages of this invention will become more readily apparent and understood from the following detailed specification and accompanying drawings in which.

Figure 1:
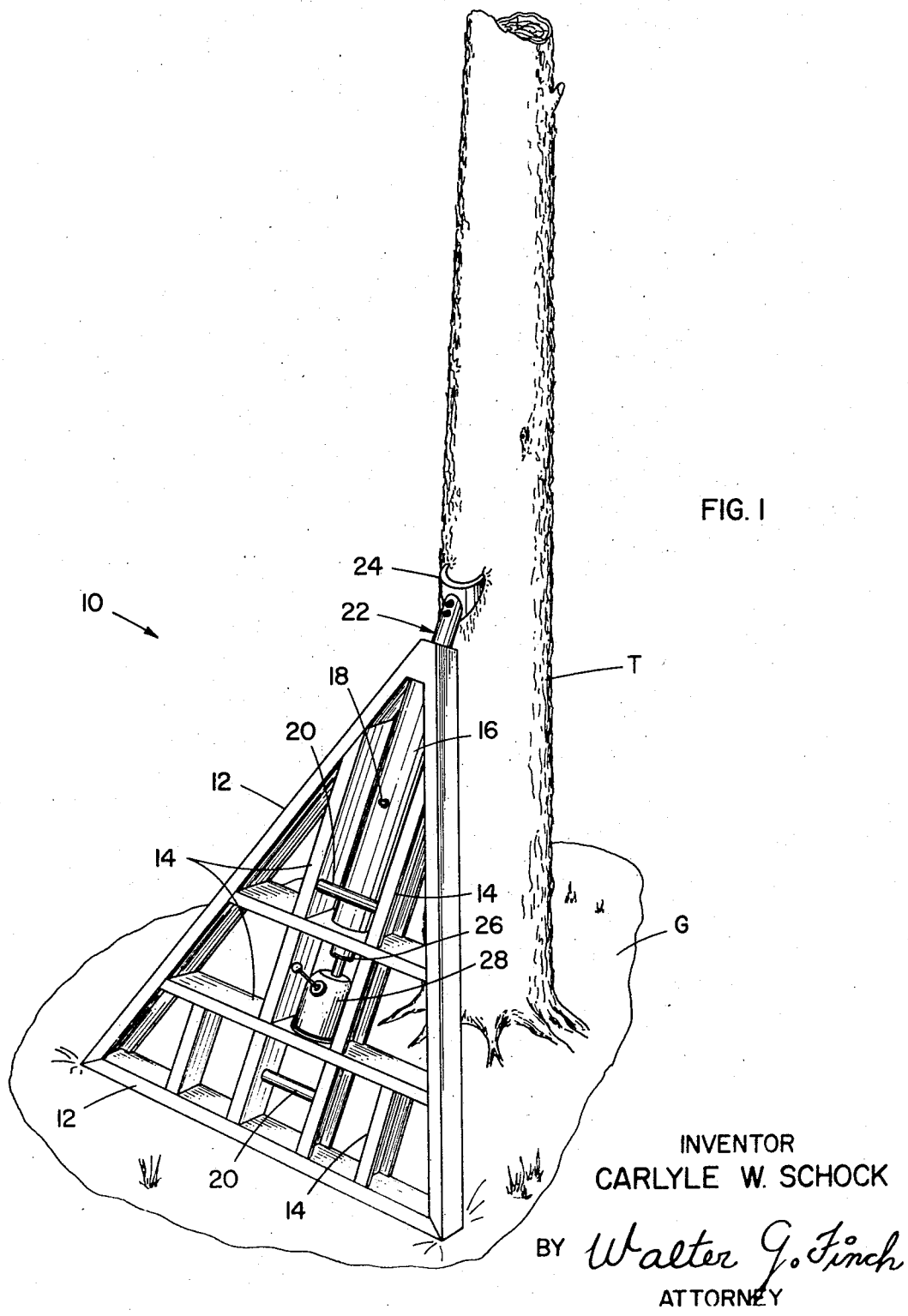
FIG. 1 is a perspective view of a tree jack directional frame system incorporating features of this invention and shown in operative position.
Figure 2:
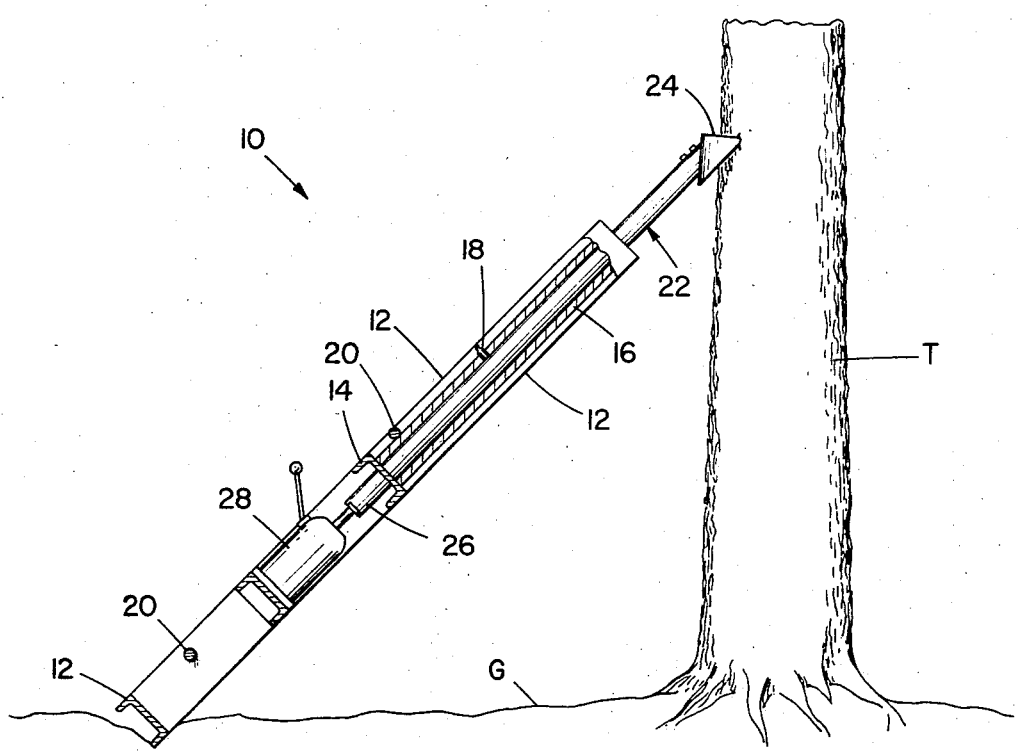
FIG. 2 is a side view of the tree jack directional frame system of FIG. 1.
Figure 3:
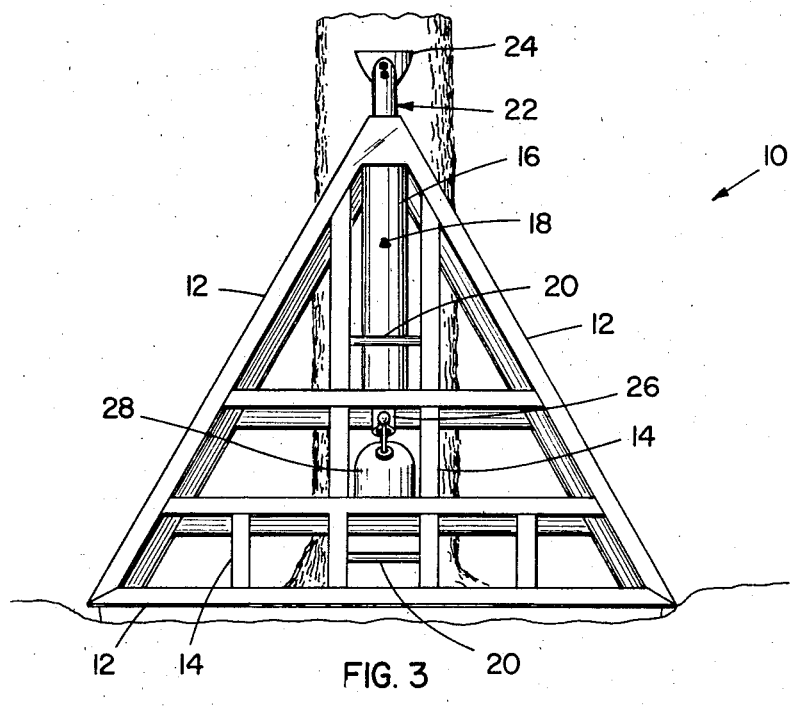
FIG. 3 is a front view of the tree jack directional frame system of FIG. 1

Referring now to the drawings, there is shown in FIGS. 1 to 3, a tree jack directional frame system 10 of this invention in operative use in directing the path of travel of a tree T which is to be felled to the ground G.

This frame system 10 consists of an equilateral shaped structure of three equal sides 12 formed of U-shaped cross section. Parallel spaced horizontal and vertical support members 14 are positioned inside of the frame system and extending from side to side thereof as shown to support the sides 12 of the frame system 10 and to prevent them from bowing inwardly. All of the parts for the frame system, that is, the sides 12 and support members 14 can be welded together to form one integral structure. The sides 12 and support members 14 are preferably constructed of strong, lightweight metal, such as aluminum or zinc coated steel for protection against corrosion.

Between the two spaced vertical support members 14, there is located a cylindrical housing 16, having centrally positioned and slidably mounted therein a cylindrical member or rod 22, whose upper end has bolted and welded thereto a substantially triangular shaped arcuate member or bar 24 for engaging a tree intermediate its height and which fits into the tree T which is to be felled to the ground G.

The triangular shaped member or bar 24 is provided with sharp leading edges for biting into the tree T. Member or bar 24, with sharp leading edges is more adaptable to various size trees. It has the general configuration of cow horns, but instead of being round, the bar's leading edges are of triangular shape.

The lower end 26 of the cylindrical member or rod 22 is notched to receive to the jack head of a hydraulic jack 28 which is located in the framework between the horizontal support members 14, as shown. A suitable grease fitting 18 is provided in the cylindrical housing 16 for lubricating the cylindrical member or piston 22 inside of housing as desired.

Suitable spaced handles 20 can be provided between the vertical support members 14 for lifting the directional jack frame system 10 into position for operational use in felling of the tree T.

It is to be noted that with an equilateral frame system 10 as shown in FIGS. 1 to 3, a firm and solid contact is made by the triangular shaped member or bar 24 with the tree T and the base side 12 of the equilateral frame system with the ground G so that when the trunk of the tree T is cut with a saw, and pressure is applied by the hydraulic jack 28 to the piston or slidable member 22 and to the arcuate member or anchor 24, the tree T can be made to fall in a predetermined direction to the ground G. If desired, a screw jack can be used in place of a hydraulic jack.

Obviously, many modifications and variations of the present invention may be made in light of the above teachings. It is, therefore, to be understood that within the scope of the appended claims, the invention may be practiced otherwise than as specifically described.

What is claimed is:

1. A tree jack directional frame system, comprising, structure defining a frame of substantially triangular configuration having a base and at least two equal length sides, at least two equally spaced support members positioned parallel to said base of said frame and extending between and connected to the two equal length sides of said frame, at least two parallel and vertically arranged support members extending from said base of said frame transversely to said first two support members and extending upwardly toward the apex of said two equal length sides of said frame and terminating in said sides, a cylindrical housing positioned between said vertically arranged support members and having one end terminating at the apex of the frame opposite said base and the other end at one of said equally spaced support members, a slidable member extending through said cylindrical housing, an arcuate shaped bar member having sharp leading edges positioned at the upper end of said slidable member for engagement with a tree intermediate its height, and jack means positioned below said cylindrical housing, with the opposite end of said slidable member being connected to said jack means so that force can be applied to said tree through said slidable member.

2. A tree jack directional frame system as recited in claim 1, wherein said triangular configuration is of equilateral shape.

3. A tree jack directional frame system as recited in claim 1, wherein said jack means is hydraulically operated.

4. A tree jack directional frame system as recited in claim 1, and handle means for positioning of said frame system to a tree to be felled.

5. A tree jack directional frame system as recited in claim 1, wherein said arcuate shaped bar is of triangular shape having sharp leading edges for biting into a tree.

* * * * *